United States Patent
Aggarwal et al.

(10) Patent No.: US 8,086,550 B2
(45) Date of Patent: Dec. 27, 2011

(54) METHODS, APPARATUSES, AND COMPUTER PROGRAM PRODUCTS FOR CLASSIFYING UNCERTAIN DATA

(75) Inventors: Charu Aggarwal, Mohegan Lake, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 11/846,004

(22) Filed: Aug. 28, 2007

(65) Prior Publication Data

US 2009/0060095 A1    Mar. 5, 2009

(51) Int. Cl.
*G06N 5/00* (2006.01)
(52) U.S. Cl. .......................................... 706/45
(58) Field of Classification Search ............ 706/45
See application file for complete search history.

(56) References Cited

OTHER PUBLICATIONS

Charu Aggarwal ("On density based transforms for uncertain data mining" Apr. 2007).*
Spiros et al ("LOCI: Fast Outlier Detection Using the Local Correlation Integral" Nov. 2002).*
Philippe Van Kerm ("Adaptive kernel density estimation" May 2003).*
Charu et al ("A Framework for clustering evolving data streams" 2003).*

* cited by examiner

*Primary Examiner* — Jeffrey A Gaffin
*Assistant Examiner* — Lut Wong
(74) *Attorney, Agent, or Firm* — Cantor Colburn LLP; William Stock

(57) ABSTRACT

Uncertain data is classified by constructing an error adjusted probability density estimate for the data, and applying a subspace exploration process to the probability density estimate to classify the data.

18 Claims, 4 Drawing Sheets

METHODS, APPARATUSES, AND COMPUTER PROGRAM PRODUCTS FOR CLASSIFYING UNCERTAIN DATA

GOVERNMENT RIGHTS

This invention was made with Government support under Contract No. H98230-05-3-0001 awarded by U.S. Intelligence Agencies. The Government has certain lights in this invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to data classification and, more particularly, to methods and apparatuses for classifying uncertain data.

2. Description of Background

Data collection methodologies rely upon incomplete, inaccurate, or uncertain information. For example, information collected from surveys is typically incomplete. As a result, the missing information must be imputed or ignored altogether. Moreover, many data sets have attribute values which are based upon approximate measurements or imputed from other attributes. In privacy-preserving data mining applications, data perturbations are explicitly added to the data in order to mask sensitive values. In other cases, a set of base data intended for use with a data mining process may itself represent an estimation or extrapolation from one or more underlying phenomena.

It is often possible to obtain a quantitative measure of the errors and uncertainties in a set of data. For example, a quantitative estimation of noise for each of a plurality of data fields may be available. Moreover, many existing scientific methods for data collection have error estimation methodologies built into the data collection and feature extraction process. When data inaccuracy arises out of the limitations of data collection equipment, the statistical error of data collection can be estimated by prior experimentation. This approach enables collecting different features of observation to different levels of approximation. In situations where a data set is generated by a statistical method such as forecasting, errors in the data set can be estimated from the statistical methodology used to construct the data. In the case of missing data, imputation procedures may be employed to estimate one or more missing data values wherein the statistical error of imputation for a given data entry is often known a priori.

While data collection methodologies have become increasingly sophisticated in recent years, the foregoing error estimation procedures are inadequate in the context of many data mining applications. The usefulness of existing data mining procedures is compromised by uncertain data. Attributes which have high levels of error are accorded the same weight as attributes having low levels of error, thereby providing data mining results that are inaccurate or misleading. Thus, if an underlying set of data is not of high quality, one cannot expect algorithms performed on such data to yield useful results. Accordingly, what is needed is an improved technique for classifying uncertain data.

SUMMARY OF THE INVENTION

Uncertain data is classified by constructing an error adjusted probability density estimate for the data, and applying a subspace exploration process to the probability density estimate to classify the data. Apparatus and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
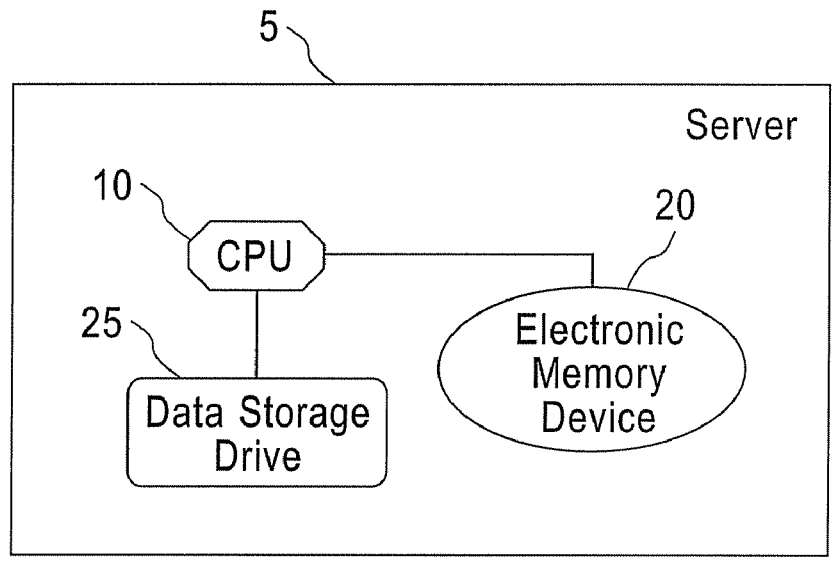
FIG. 1 is a hardware block diagram depicting an illustrative apparatus for classifying uncertain data.

FIG. 1 is a hardware block diagram depicting an illustrative apparatus for classifying uncertain data. A server 5 classifies uncertain data by constructing an error adjusted probability density estimate for the data, and applying a subspace exploration process to the probability density estimate to classify the data. Server 5 includes a central processing unit (CPU) 10 operatively coupled to an electronic memory device 20 and a data storage drive 25. Electronic memory device 20 may represent, for example, read-only memory (ROM), random access memory (RAM), a buffer memory device, a cache, another type of electronic memory, or any of various combinations thereof. Data storage drive 25 may represent, for example, a disk drive, a magnetic storage drive, an optical storage device, another type of storage drive, or any of various combinations thereof.

The computations for classifying uncertain data are performed in CPU 10 and the results are stored in data storage drive 25. These computations transform uncertain data into a density based representation which can then be used for data mining purposes. The density based representation and the original data may, but need not, be stored in data storage drive 25. Electronic memory device 20 is used to store intermediate computations for classifying the uncertain data.

Figure 2:
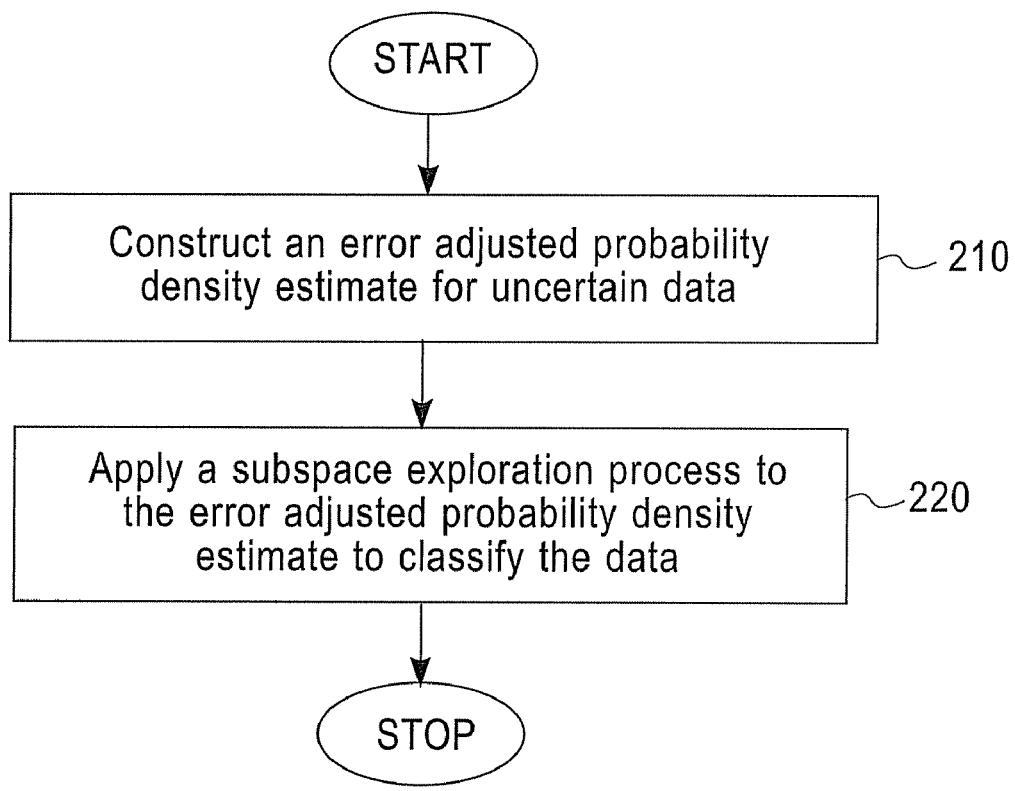
FIG. 2 is a flowchart illustrating an exemplary method for classifying uncertain data.

FIG. 2 is a flowchart illustrating an exemplary method for classifying uncertain data. This flowchart may be regarded as presenting a description of an overall approach for a density estimation and classification process. The procedure commences at block 210 where an error adjusted probability density estimate for uncertain data is constructed using a process to be described hereinafter. Next, the procedure advances to block 220 where a subspace exploration process is applied to the error adjusted probability density estimate to classify the uncertain data. In this manner, the error adjusted probability density estimate can be used in conjunction with any of a variety of data mining applications. More specifically, although the present example discusses the application of density estimation to a data classification problem, the procedure of FIG. 2 can be applied to any data mining application that uses density estimation as an intermediate step in the application. Further details regarding the steps of FIG. 2 are set forth hereinafter in connection with FIGS. 3-5.

Figure 3:
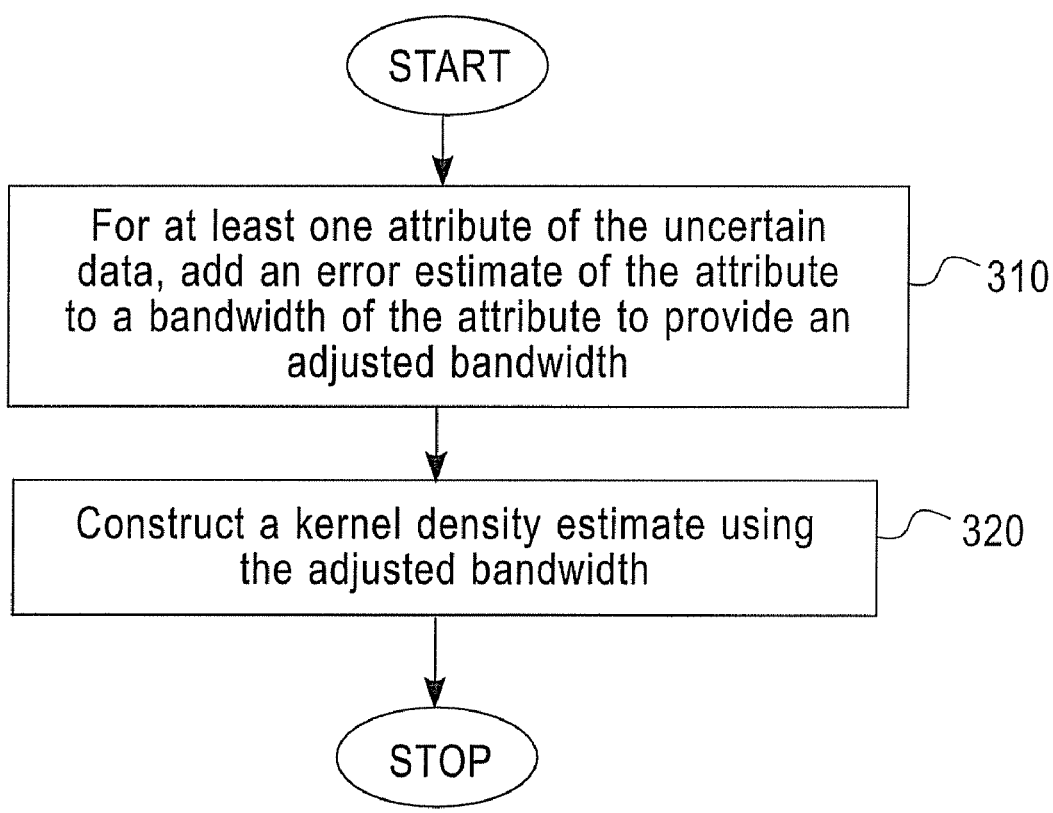
FIG. 3 is a flowchart illustrating a first exemplary method for constructing an error adjusted probability density estimate from uncertain data.
Figure 4:
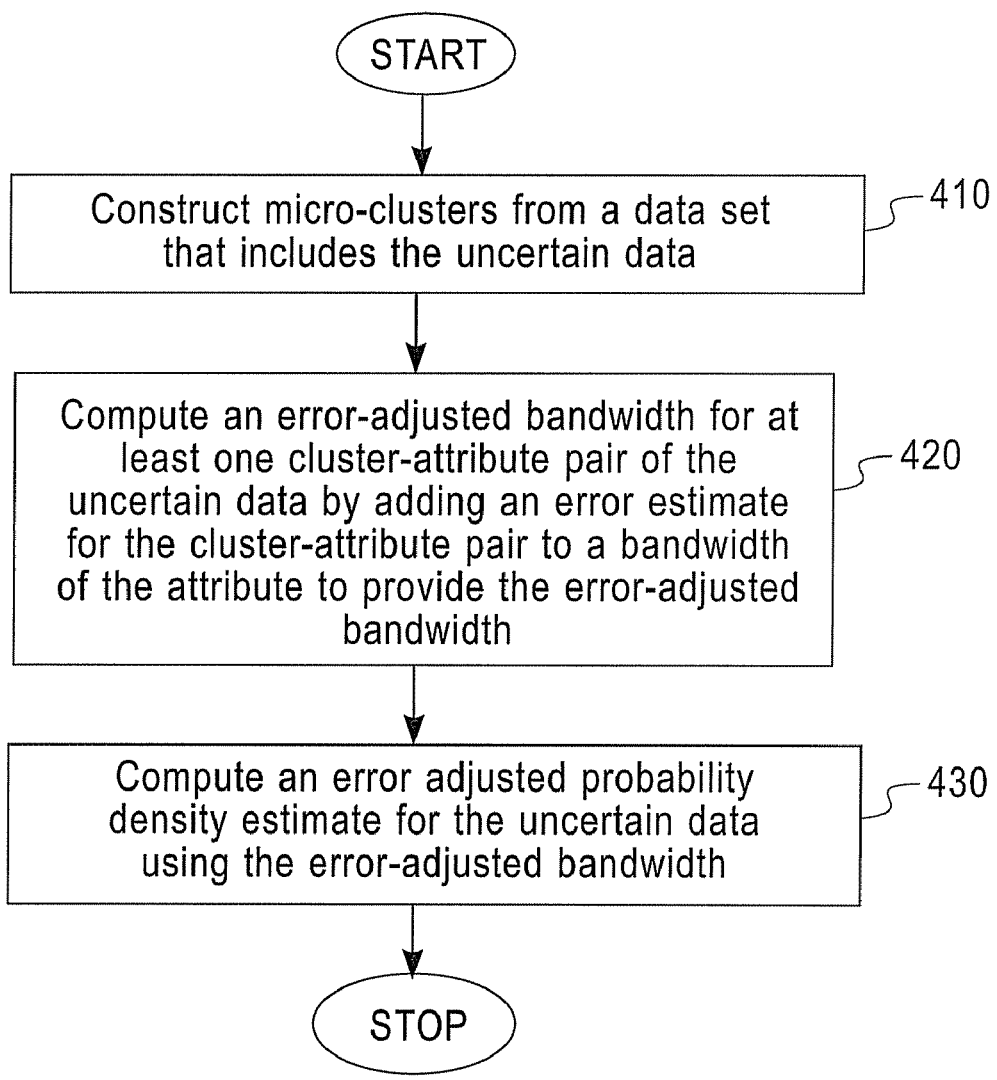
FIG. 4 is a flowchart illustrating a second exemplary method for constructing an error adjusted probability density estimate from uncertain data.
Figure 5:
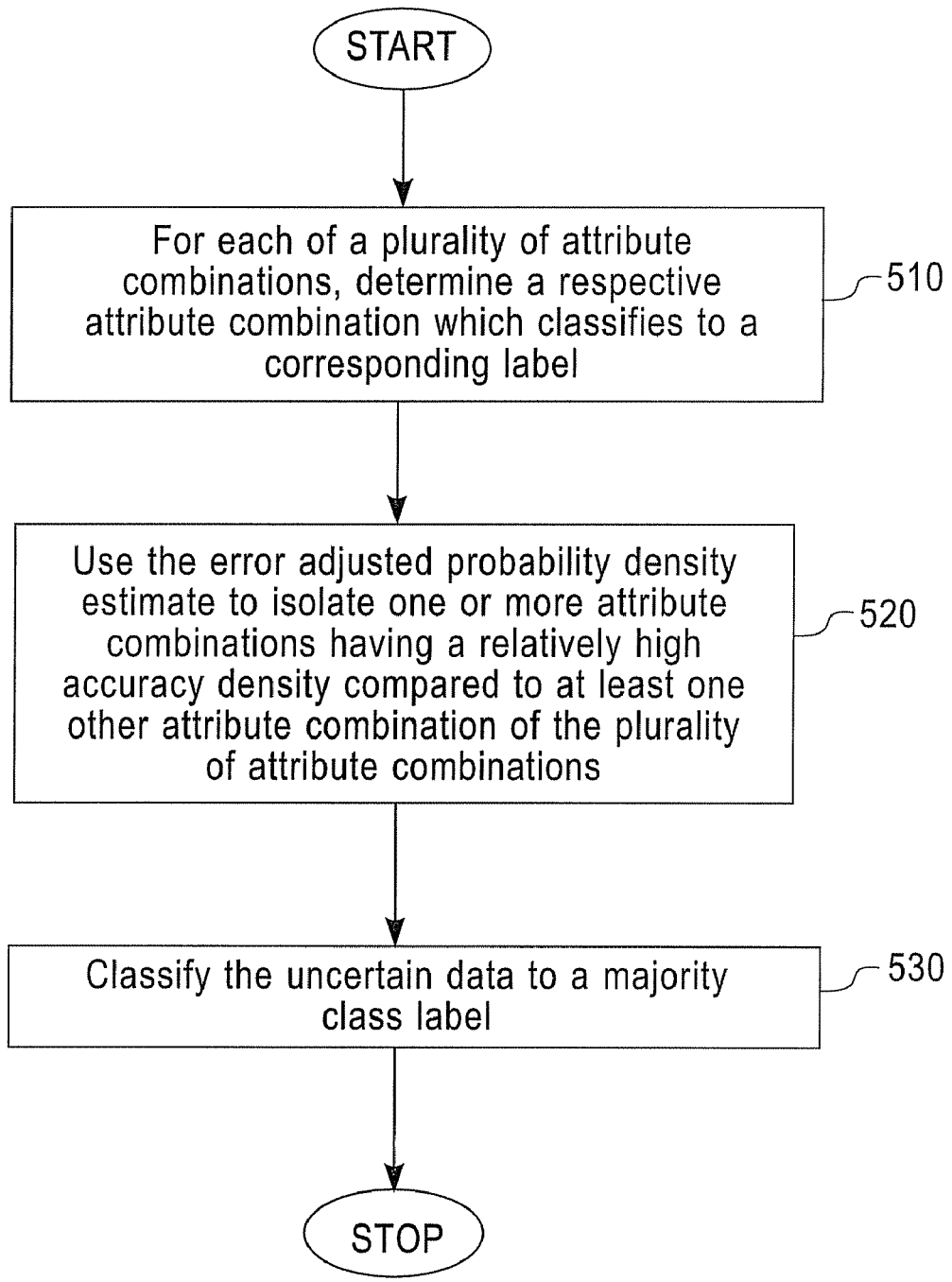
FIG. 5 is a flowchart illustrating an exemplary method for applying a subspace exploration process to the probability density estimate constructed using any of FIG. 2, 3, or 4 to classify uncertain data.

Prior to discussing FIGS. 3-5, it may be useful to introduce some additional notations and definitions. Assume that a data set D of uncertain data contains N points and d dimensions. The actual records of the data are denoted by $X_1, X_2, \ldots X_N$. It is assumed that an estimated error associated with the jth dimension for data point $X_i$ is denoted by $\rho_j X_i$. The interpretation of this error value can vary with the nature of the data mining application. For example, in a scientific application where measurements can vary from one observation to another, the error value is the standard deviation of the observation over a large number of measurements. In a k-anonymity based data (or incomplete data) mining application, this is the standard deviation of the partially specified (or imputed) fields in the data. Even though the error may be defined as a function of the field (or dimension) in most applications, it is possible to make a more generalized assumption in which the error is defined by both a row and a field of the data. This generalized assumption is useful in situations where different parts of the data are derived from heterogeneous sources.

FIG. 3 is a flowchart illustrating a first exemplary method for constructing an error adjusted probability density estimate from uncertain data. This method provides a density estimate using a kernel density estimation procedure. Accordingly, FIG. 3 may be considered as providing an illustrative implementation for block 210 of FIG. 2. The procedure of FIG. 3 commences at block 310 where, for at least one attribute of the uncertain data, an error estimate of the attribute is added to a bandwidth (i.e., a kernel width) of the attribute to provide an adjusted bandwidth. In practice, the bandwidth along each attribute of the uncertain data may be computed by adding the error estimate of the attribute to a non-error-adjusted bandwidth for that attribute. Thus, the bandwidths are higher when noise is present in the uncertain data. One illustrative method for computing the non-error-adjusted bandwidth is described, for example, in a reference entitled, "Density Estimation for Statistics and Data Analysis" by B. W. Silverman, published by Chapman and Hall in 1986. Next, at block 320, a kernel density estimate is constructed using the adjusted bandwidth. Block 320 may be performed by adding a kernel function for each data point of the uncertain data to the estimated density. The kernel function may, but need not, be a gaussian kernel or a uniform kernel.

Kernel density estimation provides a continuous estimate of the density of the data at a given point. The value of the density at a given point is estimated as the sum of the smoothed values of kernel functions $K'_{h(\cdot)}$ associated with each point in a data set that includes uncertain data. Each kernel function $K'_{h(\cdot)}$ is associated with a kernel width h that determines a level of smoothing created by the kernel function. Accordingly, h may be referred to as a kernel width, a smoothing parameter, or a bandwidth, and these terms will be used synonymously herein. The kernel estimation f(x) based on N data points and kernel function $K'_{h(\cdot)}$ is defined as follows: $f(x) = (1/N) \Sigma_{\{i=1\}} N\ K'_h(x-X_i)$. Thus, each discrete point $X_i$ in the data set is replaced by a continuous function $K'_{h(\cdot)}$ which peaks at $X_i$ and has a variance which is determined by the smoothing parameter h. An example of such a distribution would be a gaussian kernel with kernel width h. This corresponds to the gaussian distribution with zero mean and variance $h^2$.

One overall effect of kernel density estimation is to convert a discrete data set into a continuous density estimate by replacing each data point with a smoothed bump having a bump width determined by smoothing parameter h. The density distribution at a given coordinate is equal to the sum of the contributions of all the bumps represented by the data points. The result is a continuous distribution in which random artifacts are suppressed and the density behavior provides a global overview of the dense regions as well as the sparsely populated regions of data. The estimation error depends upon the kernel width h (equivalent to the smoothing parameter h) which is chosen in a data driven manner. For a d-dimensional case, the kernel function is chosen to be the product of d identical kernels $K_{i(\cdot)}$, each with its own smoothing parameter $h_i$.

The presence of errors or uncertainties in the data set can change the density estimates because of the different levels of error in different entries or fields. For example, a data point or field with very large error should affect the density estimation of its locality to a smaller extent than a data point or field which contains small errors. When estimations of such errors are available, it may be desirable to incorporate them into the estimation process. A direct method for doing so is to adapt the kernel function so that the measurement errors are taken into account during the calculation of the density distribution at block 210 (FIG. 2). Correspondingly, an error-based kernel function may be defined as follows: $Q'_h(x-X_i, \rho X_i)$, which depends both upon the error as well as the values of the underlying data points.

The overall effect of changing the kernel function is that the width of a bandwidth along a corresponding dimension (i.e., kernel width h) is increased by $\rho X_i$. The intuition behind this choice of modifying the kernel is to adjust the contributions of the kernel function for a point in accordance with the error based probability density of the point. In a limiting case where there are a large number of data points N, the value of the bandwidth (i.e., the value of kernel width h) approaches zero. Such a kernel function would have a gaussian distribution with a standard error exactly equal to the standard error of the data point. Conversely, the error-based kernel function converges to the standard kernel function when the value of the error $\rho X_i$ is zero. Therefore, in the foregoing boundary cases, the direct error-based generalization of the kernel function has a probability distribution with the same standard error as the data point. It is also clear that, in the limiting case of a large number of data points where the kernel width h tends to zero, the kernel function reflects the errors in each data point accurately.

As in the previous case, the error-based density at a given data point is defined as the sum of the error-based kernels over different data points. The error based kernel is defined by adding the error to the bandwidth (i.e., to the kernel width h). Also, as in the previous case, the kernel function definition can be generalized to a multi-dimensional case. Specifically, the error for the jth dimension is denoted by $\rho_j(X_i)$. The overall kernel function is defined as the product of the kernel function for the different dimensions.

As discussed previously in connection with block 220 (FIG. 2), joint probability densities may be utilized over different subspaces in order to design one or more data mining algorithms. This approach is advantageous in that it does not require the probability distribution of noise in the data. The joint probability density may need to be repeatedly computed over different subsets of dimensions for particular data mining problems. If the data set is too large to maintain in electronic memory device 20 (FIG. 1), repeated passes over the data may be performed for the computation of the density over different subsets of dimensions. Since this option does not scale very well for large data sets, methods may be utilized which condense the data points into a smaller number of pseudo-points but with a slightly larger error. Such an approach can be implemented for larger data sets by maintaining the pseudo-points in electronic memory device 20 for the computation of the density over different subsets of dimensions. Accordingly, this approach can be generalized to very large data sets, and also to data streams.

FIG. 4 is a flowchart illustrating a second exemplary method for constructing an error adjusted probability density estimate from uncertain data. This method is useful in situations where a data set is quite large and cannot be efficiently processed for data estimation purposes. Accordingly, FIG. 4 may be considered as providing an illustrative implementation for block 210 of FIG. 2. The procedure of FIG. 4 commences at block 410 where micro-clusters are constructed from a data set that includes uncertain data. This enables a large amount of data to be condensed into a manageable number of micro-clusters. Next, at block 420, an error-adjusted bandwidth is computed for at least one cluster-attribute pair of the uncertain data by adding an error estimate for the cluster-attribute pair to a bandwidth of the attribute to provide the error-adjusted bandwidth. This step may, but need not, be performed for all cluster-attribute pairs of the uncertain data. Once micro-clusters are constructed, they are used in order to estimate the density of the underlying data. At block 430, an error adjusted probability density estimate for the uncertain data is computed using the error adjusted bandwidth.

An illustrative process of constructing micro-clusters using statistics will be described in greater detail hereinafter. However, it should be understood that various alternative methods for micro-cluster construction are well known to those of ordinary skill in the relevant art as described, for example, in a reference entitled, "A Framework for Clustering Evolving Data Streams" by C. C. Aggarwal, J. Han, J. Wang, and P. Yu, VLDB Conference, 2003. The invention is not limited to using any particular method of constructing micro-clusters.

In order to leverage the concept of micro-clustering to perform error-based density estimation for large data sets and data streams, it is necessary to determine the manner in which the error-based density may be computed using micro-cluster statistics instead of individual data points. Assume that a data stream consists of a set of respective multidimensional records $\{X\}_1 \ldots \{X_K\}$ arriving at corresponding time stamps $T_1 \ldots T_K$. Each $\{X\}_i$ is a multidimensional record containing d dimensions which are denoted by $X_i=(x_i1 \ldots x_id)$. The error-based micro-clusters may, but need not, be expressed in an additive manner over a plurality of data points. The concept of error-based micro-clusters will now be defined more precisely. A micro-cluster for a respective set of d-dimensional points $X_{\{i\;1\}} \ldots X_{\{i\;n\}}$ with corresponding time stamp $T_{\{i\;1\}} \ldots T_{\{i\;n\}}$ is defined as a (3d+1) tuple as follows:

(1) For each dimension, the sum of the squares of the data values is maintained. Thus, this sum contains d entries.

(2) For each dimension, the sum of the data values is maintained. Thus, this sum contains d values.

(3) For each dimension, the sum of the errors is maintained. This sum contains d values.

(4) The number of points in the data is maintained in n.

One aim of the micro-clustering process is to compress the data so that the resulting statistics can be held in electronic memory device 20 (FIG. 1) for repeated passes during the density estimation process over different subspaces. Therefore, the total number of microclusters q to be provided is defined by the amount of memory available in electronic memory device 20. Given the large memory sizes available even on modest desktop hardware, this corresponds to thousands of micro-clusters for data sets containing hundreds of dimensions. This means that a high level of granularity in data representation can be maintained. This level of granularity may be necessary if it is desired to use the micro-clusters as surrogates for the original data.

Each micro-cluster is subsequently used as a summary representation in order to compute the densities over different subspaces (block 220, FIG. 2). Accordingly, it is helpful to design a kernel function which adapts to variances in the data points within a cluster as well as errors in the data points. Therefore, the sum of the variance and the errors are employed to determine a new bandwidth for the data. Subsequently, density-based algorithms may be employed for data mining purposes.

FIG. 5 is a flowchart illustrating an exemplary method for applying a subspace exploration process to the probability density estimate constructed using any of FIG. 2, 3, or 4 to classify uncertain data. Accordingly, FIG. 5 may be considered as providing an illustrative implementation for block 220 of FIG. 2. The procedure of FIG. 5 commences at block 510 where, for each of a plurality of attribute combinations for the data, a respective attribute combination is determined which classifies to a corresponding label. This step is performed by testing different combinations of attributes and determining the resulting accuracy density within the locality of a test instance. The accuracy density is defined as the ratio of the density of the contributions of a class (i.e., class-specific density) to the density of an entire data set (i.e., the overall density). Alternatively or additionally, a related measure called the interest density may be employed. The interest density is defined as the relative density of a particular class to the entire data set. Any of a wide variety of methods may be employed to construct different functions of the class-specific density and the overall density.

Next, at block 520, the error adjusted probability density estimate is used to isolate one or more attribute combinations having a relatively high accuracy density compared to at least one other attribute combination of the plurality of attribute combinations. For a given test instance, the number (quantity) of possible combinations of attributes which classify to the given test instance is determined. At block 530, the uncertain data is classified to a majority class label. The majority class label is defined as the label which occurs in the maximum number of combinations of dimensions. The approach of FIG. 5 can be employed in any of a wide variety of data mining problems where density estimation is used as an intermediate step for the mining process.

Methods for classifying uncertain data have been discussed in conjunction with FIGS. 2-5. In general, some of the illustrated approaches use a density estimation technique to remove noise from the underlying data. Once the noise has been removed, the "sanitized" data can be used for classification purposes. While various embodiments disclosed herein have been described in the context of data classification, these embodiments may also be generalized in principle to any type of data mining application.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for classifying uncertain data, the method comprising:
   receiving uncertain data from a memory device;
   constructing an error adjusted probability density estimate for the uncertain data with a processor, and applying a subspace exploration process to the error adjusted probability density estimate to classify the uncertain data, wherein applying a subspace exploration process to the probability density estimate to classify the uncertain data is performed by determining, for each of a plurality of attribute combinations, a respective attribute combination which classifies to a corresponding label by testing combinations of attributes and determining a resulting accuracy density within a locality of a test instance; and
   outputting the classified uncertain data to a user.

2. The method of claim 1 wherein constructing an error adjusted probability density estimate for the data is performed for at least one attribute of the data by adding an error estimate of the attribute to a bandwidth of the attribute to provide an adjusted bandwidth.

3. The method of claim 2 further comprising constructing a kernel density estimate using the adjusted bandwidth.

4. The method of claim 1 wherein constructing an error adjusted probability density estimate for the data is performed by constructing a plurality of micro-clusters from the data.

5. The method of claim 4 further comprising computing an error adjusted bandwidth for at least one cluster-attribute pair of the data by adding an error estimate for the cluster-attribute pair to a bandwidth of the attribute to provide the error-adjusted bandwidth.

6. The method of claim 1 further comprising isolating one or more attribute combinations having a relatively high accuracy density compared to at least one other attribute combination of the plurality of attribute combinations by utilizing the error adjusted probability density estimate.

7. A computer program product for classifying uncertain data, the computer program product comprising a storage medium readable by a processing circuit and storing instructions for execution by the processing circuit for facilitating a method comprising:
   receiving uncertain data from a memory device;
   constructing an error adjusted probability density estimate for the uncertain data with a processor,
   applying a subspace exploration process to the error adjusted probability density estimate to classify the uncertain data, wherein applying a subspace exploration process to the probability density estimate to classify the uncertain data is performed by determining, for each of a plurality of attribute combinations, a respective attribute combination which classifies to a corresponding label by testing combinations of attributes and determining a resulting accuracy density within a locality of a test instance; and
   outputting the classified uncertain data to a user.

8. The computer program product of claim 7 wherein constructing an error adjusted probability density estimate for the data is performed for at least one attribute of the data by adding an error estimate of the attribute to a bandwidth of the attribute to provide an adjusted bandwidth.

9. The computer program product of claim 8 further comprising instructions for constructing a kernel density estimate using the adjusted bandwidth.

10. The computer program product of claim 7 wherein constructing an error adjusted probability density estimate for the data is performed by constructing a plurality of micro-clusters from the data.

11. The computer program product of claim 10 further comprising instructions for computing an error adjusted bandwidth for at least one cluster-attribute pair of the data by adding an error estimate for the cluster-attribute pair to a bandwidth of the attribute to provide the error-adjusted bandwidth.

12. The computer program product of claim 7 further comprising instructions for isolating one or more attribute combinations having a relatively high accuracy density compared to at least one other attribute combination of the plurality of attribute combinations by utilizing the error adjusted probability density estimate.

13. An apparatus for classifying uncertain data, the apparatus comprising:
   a memory device including stored uncertain data; and
   a processing mechanism operatively coupled to the memory device, the processing mechanism operative to construct an error adjusted probability density estimate for the uncertain data, and apply a subspace exploration process to the error adjusted probability density estimate to classify the uncertain data, wherein applying a subspace exploration process to the probability density estimate to classify the uncertain data is performed by determining, for each of a plurality of attribute combinations, a respective attribute combination which classifies to a corresponding label by testing combinations of attributes and determining a resulting accuracy density within a locality of a test instance.

14. The apparatus of claim 13 wherein the processing mechanism constructs an error adjusted probability density estimate for at least one attribute of the data by adding an error estimate of the attribute to a bandwidth of the attribute to provide an adjusted bandwidth.

15. The apparatus of claim 14 wherein the processing mechanism constructs a kernel density estimate using the adjusted bandwidth.

16. The apparatus of claim 13 wherein the processing mechanism constructs an error adjusted probability density estimate for the data by constructing a plurality of microclusters from the data.

17. The apparatus of claim 16 wherein the processing mechanism computes an error adjusted bandwidth for at least one cluster-attribute pair of the data by adding an error estimate for the cluster-attribute pair to a bandwidth of the attribute to provide the error-adjusted bandwidth.

18. The apparatus of claim 13 wherein the processing mechanism isolates one or more attribute combinations having a relatively high accuracy density compared to at least one other attribute combination of the plurality of attribute combinations by utilizing the error adjusted probability density estimate.

* * * * *